US011894617B2

(12) United States Patent
Yeh

(10) Patent No.: US 11,894,617 B2
(45) Date of Patent: *Feb. 6, 2024

(54) ROTATING CONTROLLING METHOD FOR AN ANTENNA

(71) Applicant: AMBIT MICROSYSTEMS (SHANGHAI) LTD., Shanghai (CN)

(72) Inventor: Shun-Hsing Yeh, Taoyuan (TW)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 422 days.

This patent is subject to a terminal disclaimer.

(21) Appl. No.: 17/341,656

(22) Filed: Jun. 8, 2021

(65) Prior Publication Data

US 2021/0296768 A1 Sep. 23, 2021

Related U.S. Application Data

(60) Continuation of application No. 16/511,227, filed on Jul. 15, 2019, now Pat. No. 11,069,972, which is a division of application No. 14/954,971, filed on Nov. 30, 2015, now Pat. No. 10,396,453.

(30) Foreign Application Priority Data

Sep. 18, 2015 (TW) ................................ 104130997

(51) Int. Cl.
*H01Q 3/04* (2006.01)
*H01Q 1/12* (2006.01)

(52) U.S. Cl.
CPC ............ *H01Q 3/04* (2013.01); *H01Q 1/1257* (2013.01)

(58) Field of Classification Search
CPC .............................. H01Q 1/1257; H01Q 3/04
See application file for complete search history.

(56) References Cited

U.S. PATENT DOCUMENTS

2005/0085696 A1* 4/2005 Uchiyama .............. A61B 1/041 600/128
2005/0162325 A1* 7/2005 Tietjen .................. H01Q 21/24 343/757
2008/0248798 A1* 10/2008 Chung ................ H01Q 1/2291 455/425
2009/0296328 A1* 12/2009 Lin ...................... G06F 1/1686 361/679.02

* cited by examiner

*Primary Examiner* — Timothy X Pham
(74) *Attorney, Agent, or Firm* — ScienBiziP, P.C.

(57) ABSTRACT

A rotating controlling method for an antenna, the steps includes collecting parameters for indicating signal strength of the antenna; and determining an optimal radiation position of the antenna and setting the corresponding value of a repulsive force or an attractive force so that the antenna is rotated to the optimal radiation position.

2 Claims, 9 Drawing Sheets

ROTATING CONTROLLING METHOD FOR AN ANTENNA

CROSS-REFERENCE TO RELATED APPLICATIONS

This application is a Continuation Application of pending U.S. patent application Ser. No. 16/511,227, filed on Jul. 15, 2019, and entitled "ROTATING CONTROLLING METHOD FOR AN ANTENNA", which is a Divisional Application of U.S. patent Ser. No. 10/396,453, filed on Nov. 30, 2015 and entitled "ANTENNA, ROTATING UNIT, WIRELESS COMMUNICATION DEVICE AND ROTATING CONTROLLING METHOD", the entirety content of which is incorporated by reference herein.

FIELD

The subject matter herein generally relates to a rotating controlling method for an antenna.

BACKGROUND

When wireless communication devices establish wireless network connection, due to different antenna radiation patterns in each direction or an obstructions blocking, signal strength in a specific direction will be lower, which will lead to a directional problem, that is a low connecting speed, even break wireless network connection.

BRIEF DESCRIPTION OF THE DRAWINGS

Implementations of the present disclosure will now be described with reference to the attached figures.

DETAILED DESCRIPTION

Figure 1:
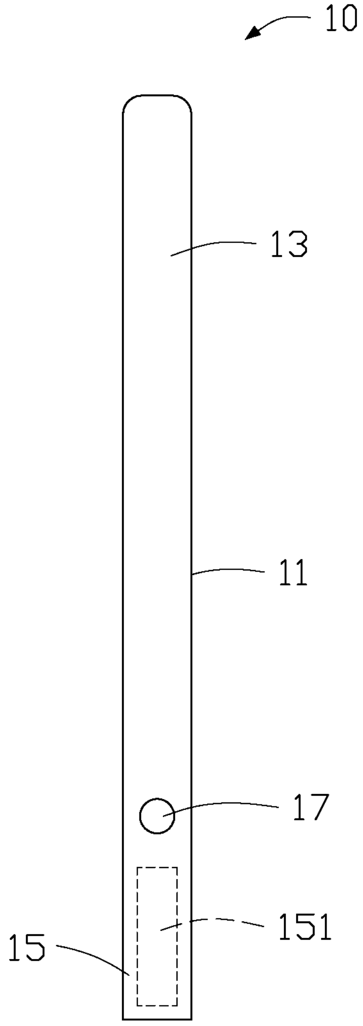
FIG. 1 is a cross-section view of an embodiment of an antenna applying to a wireless communication device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to an antenna module and a wireless communication device using same.

Figure 2:
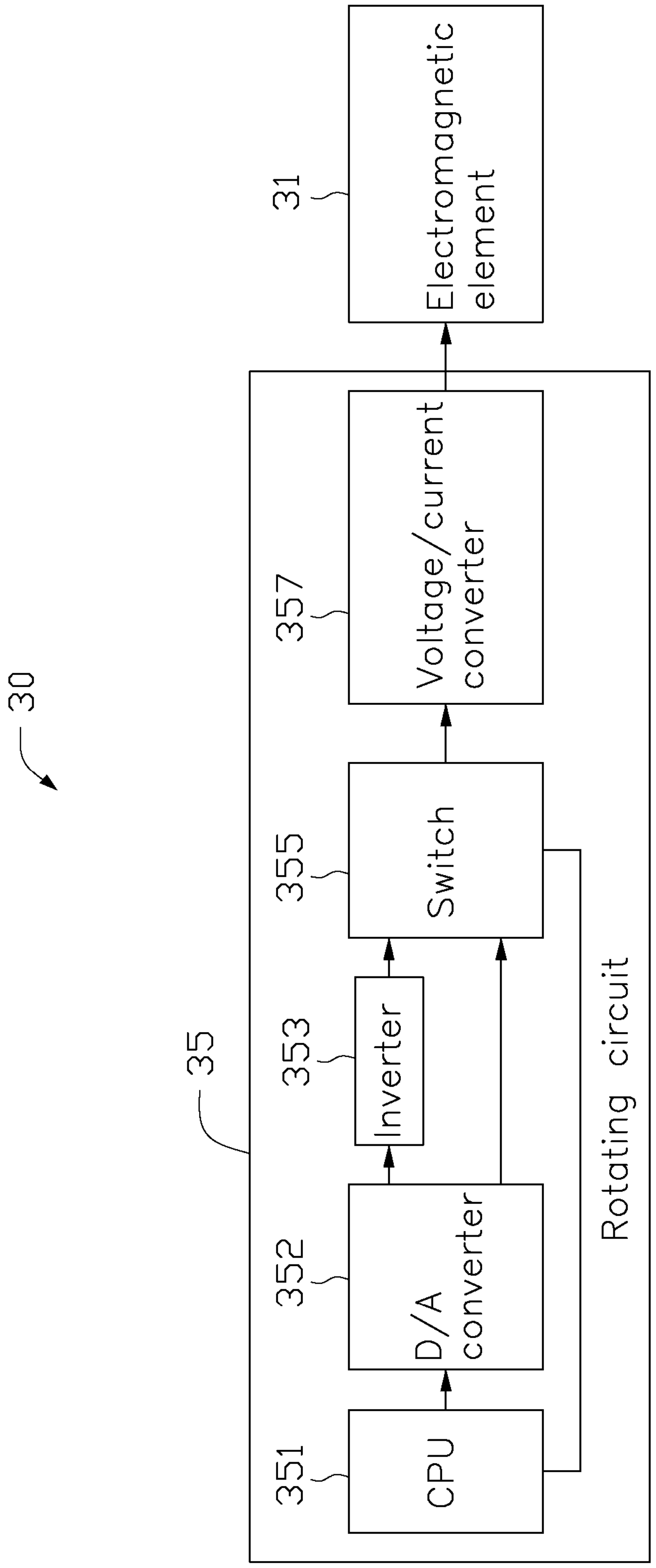
FIG. 2 is a block diagram of a rotating unit of the wireless communication device of FIG. 1.

FIG. 1 illustrates an embodiment of a wireless communication device (not labeled) employing an antenna 10 and a rotating unit 30 (shown in FIG. 2). The rotating unit 30 is configured to control the antenna 10 to rotate, thereby the antenna 10 can rotate to an optimal location for obtaining a stable radiation performance.

The antenna 10 includes a housing 11, an antenna end 13, a rotating end 15, and a rotating shaft 17.

The housing 11 is substantially a long strip. The antenna end 13 is positioned at a first end of the housing 11. The rotating end 15 is position at a second end of the housing 11 opposite to the first end. The antenna end 13 includes a radiation body received in an interior of the housing 11 and is configured to receive/send radio signal. The rotating end 15 includes a permanent magnet 151. The rotating shaft 17 is positioned between the antenna end 13 and the rotating end 15, and is slightly close to the rotating end 15. The rotating end 15 rotates around the rotating shaft 17 under a magnetic effect provided by the rotating unit 30, so as to adjust a direction of the antenna end 13.

FIG. 2 illustrates that the rotating unit 30 includes an electromagnetic element 31 and a rotating circuit 35 electrically connected to the electromagnetic element 31, for example, an electromagnet. The rotating circuit 35 is configured to control the electromagnetic element 31 to generate a magnetic force for controlling a rotation of the antenna 10.

In one embodiment, the rotating circuit 35 includes a central processing unit (CPU) 351, a D/A converter 352, an inverter 353, a switch 355, and a voltage/current converter 357. The CPU 351 is electrically connected to the D/A converter 352. One end of the D/A converter 352 is directly and electrically connected to the switch 355. The other end of the D/A converter 352 is electrically connected to the switch 355 through the inverter 353. The switch 355 is electrically connected to the voltage/current converter 357 and the voltage/current converter 357 is electrically connected to the electromagnetic element 31.

The CPU 351 is configured to detect a signal receiving/sending strength of the antenna 10, provide different voltages to the D/A converter 352 according to the detected signal receiving/sending strength, and control a switching of the switch 355. The D/A converter 352 is configured to convert the voltage provided by the CPU 351 from an analog signal to a digital signal. The inverter 353 is configured to invert the voltage from the D/A converter 352. In one embodiment, the switch 355 is a single pole double throw switch and is configured to select one of the D/A converter 352 and the inverter 353 to be electrically connected to the voltage/current converter 357. The voltage/current converter 357 converts the voltage from the D/A converter 352 or the inverter 353 to a current and outputs the current to the electromagnetic element 31, so as to control a magnetic force and a polarity direction of the electromagnetic element 31.

Figure 3:
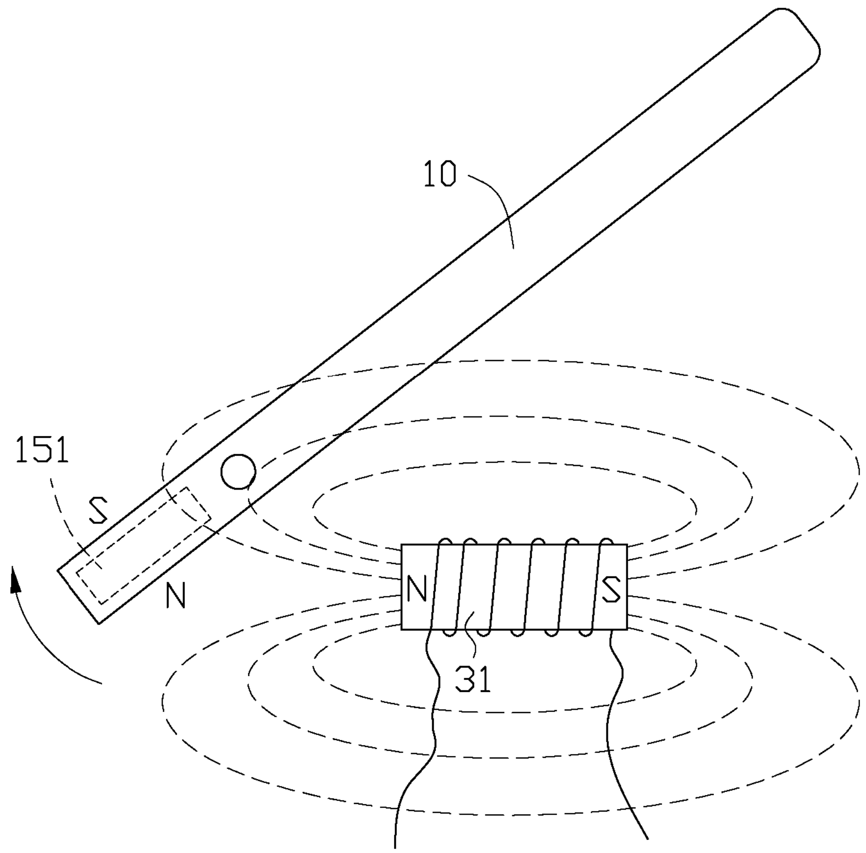
FIG. 3 is a schematic diagram showing the rotating unit generating a repulsive force on the antenna.
Figure 4:
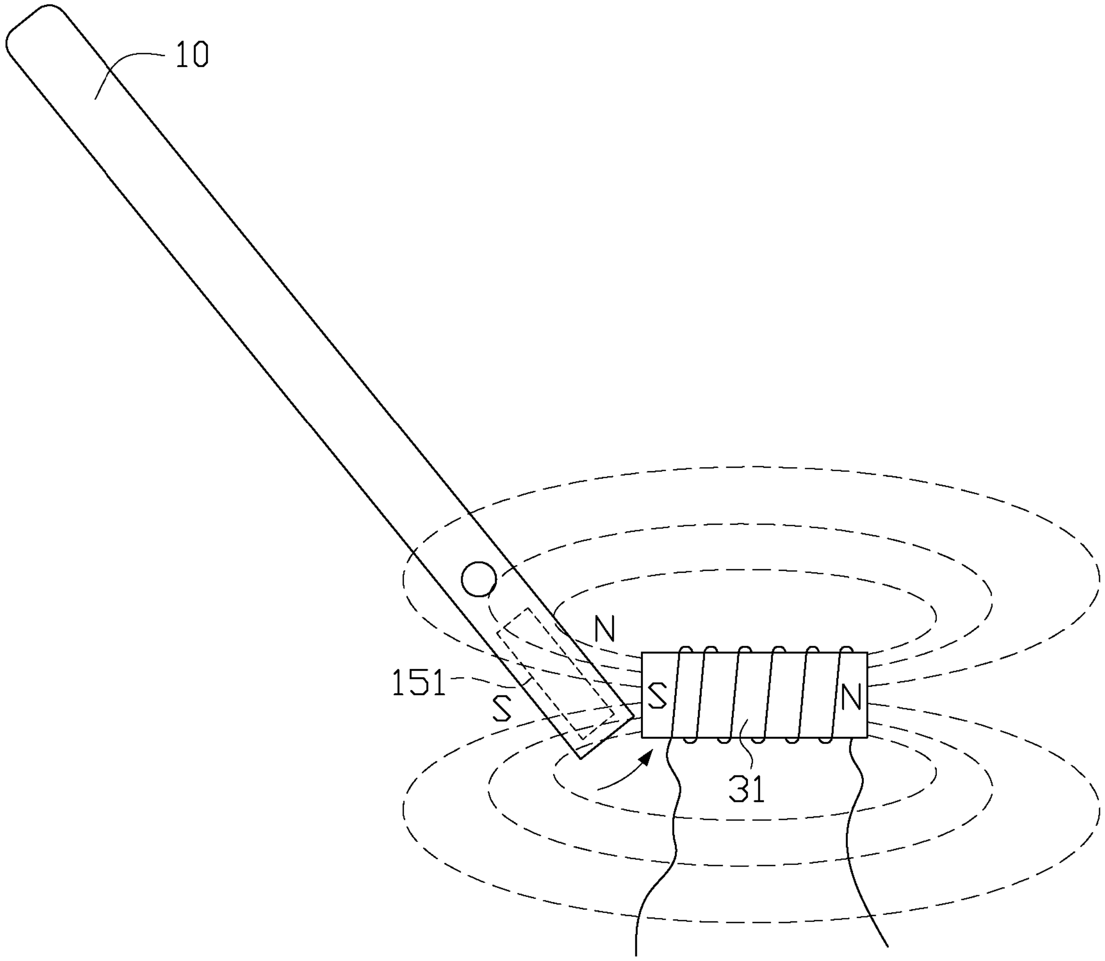
FIG. 4 is similar to FIG. 3, but showing the rotating unit generating an attractive force on the antenna.

In at least one embodiment, the voltage from the D/A converter 352 or the inverter 353 can control the electromagnetic element 31 to generate an attractive force and a repulsive force on the antenna 10. For example, FIG. 3 illustrates that when the CPU 351 controls the switch 355 to elect the D/A converter 352 to be electrically connected to voltage/current converter 357, the electromagnetic element 31 generates a repulsive force on the antenna 10. Then the rotating end 15 of the antenna 15 rotates around the rotating shaft 17 along a first direction, for example, a clockwise direction, which drives the antenna end 13 to rotate. FIG. 4 illustrates that when the CPU 351 controls the switch 355 to elect the inverter 353 to be electrically connected to the voltage/current converter 357, the electromagnetic element 31 generates an attractive force on the antenna 10. Then the rotating end 15 of the antenna 15 rotates around the rotating shaft 17 along a second direction, for example, a counter-clockwise direction, which drives the antenna end 13 to rotate. Thus, a direction of the antenna 10 can be adjusted until the antenna 10 rotates to an optimal angle.

Figure 5:
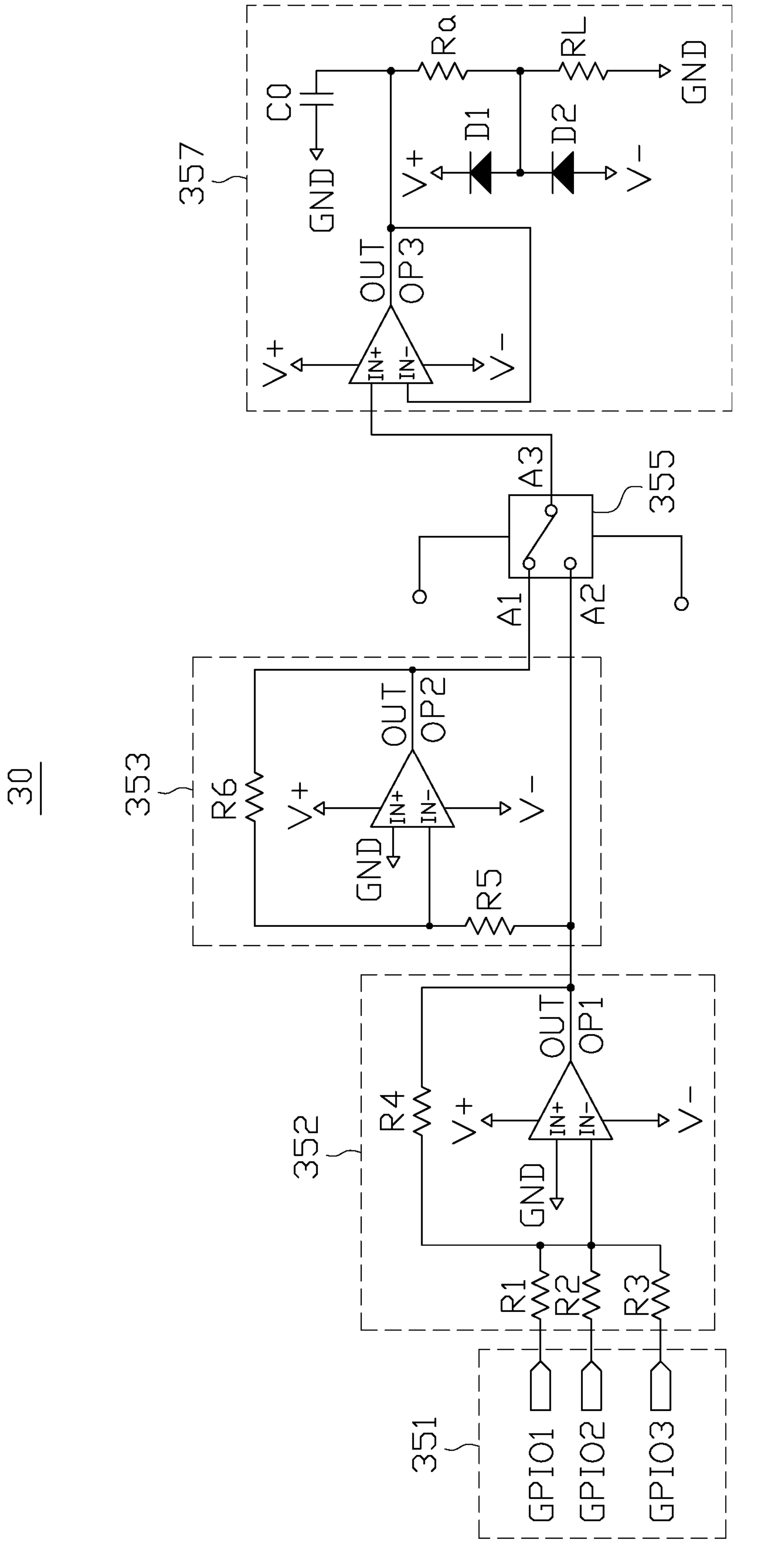
FIG. 5 is a circuit diagram of the rotating unit of the wireless communication device of FIG. 1.

As illustrated in FIG. 5, in at least one embodiment, the CPU 351 includes a first general input/output pin GPIO 1, a second general input/output pin GPIO 2, and a third general input/output pin GPIO 3. The D/A converter 352 includes a first operational amplifier OP1, a first resistor R1, a second resistor R2, a third resistor R3, and a fourth resistor R4. The first operational amplifier OP1 includes a positive input pin INT+, a negative input pin IN−, and an output pin OUT. The positive input pin IN+ of the first operational amplifier OP1 is grounded. The first general input/output pin GPIO 1, the second general input/output pin GPIO 2, and the third general input/output pin GPIO 3 are respectively connected to the negative input pin IN− of the first operational amplifier OP1 through the first resistor R1, the second resistor R2, and the third resistor R3. The negative input pin IN− of the first operational amplifier OP1 is further electrically connected to the output pin OUT of the first operational amplifier OP1 through the fourth resistor R4. The output pin OUT is further electrically connected to the inverter 353 and the switch 355.

The inverter 353 includes a second operational amplifier OP2, a fifth resistor R5, and a sixth resistor R6. The second operational amplifier OP2 includes a positive input pin IN+, a negative input pin IN−, and an output pin OUT. The positive input pin IN+ of the second operational amplifier OP2 is grounded. The negative input pin IN− of the second operational amplifier OP2 is electrically connected to the output pin OUT of the first operational amplifier OP1 through the fifth resistor R5, and is further electrically connected to the output pin OUT of the second operational amplifier OP2 through the sixth resistor R6. The output pin OUT of the second operational amplifier OP2 is further electrically connected to the switch 355.

The switch 355 includes a first switching end A1, a second switching end A2, and a connecting end A3. The first switching end A1 is electrically connected to the output pin OUT of the second operational amplifier OP2. The second switching end A2 is electrically connected to the output pin OUT of the first operational amplifier OP1. The connecting end A3 is electrically connected to the voltage/current converter 357. The switch 355 is further electrically connected to the CPU 351. Then, the CPU 351 can control the connecting end A3 to switch to the first switching end A1 or the second switching end A2.

The voltage/current converter 357 includes a third operational amplifier OP3 and an adjusting resistor Ra. The third operational amplifier OP3 includes a positive input pin IN+, a negative input pin IN−, and an output pin OUT. The positive input pin IN+ of the third operational amplifier OP3 is electrically connected to the connecting end A3 of the switch 355. The negative input pin IN− of the third operational amplifier OP3 is electrically connected to the output pin OUT of the third operational amplifier OP3. The first to third operational amplifiers OP1-0P3 are all electrically connected to power supplies V+, V− thereby obtaining corresponding working voltages.

The electromagnetic element 31 has an internal resistance, which is labeled as RL. Then, a first end of the adjusting resistor Ra is electrically connected to the output pin OUT of the third operational amplifier OP3. A second end of the adjusting resistor Ra is grounded through the electromagnetic element 31. That is, the adjusting resistor Ra and the electromagnetic element 31 are connected in series between the output pin OUT of the third operational amplifier OP3 and the ground. The first end of the adjusting resistor Ra connected to the output pin OUT of the third operational amplifier OP3 is further grounded through a capacitor C0. The second end of the adjusting resistor Ra connected to the electromagnetic element 31 is further electrically connected to an anode of a first diode D1 and a cathode of a second diode D2. A cathode of the first diode D1 is electrically connected to the power source V+. An anode of the second diode D2 is electrically connected to the power source V−. In one embodiment, the first diode D1 and the second diode D2 are flywheel diode for protecting inductance components. The output pin OUT of the third operational amplifier OP3 is electrically connected to the electromagnetic element 31 through the adjusting resistor Ra for outputting the current to the electromagnetic element 31.

Figure 6:
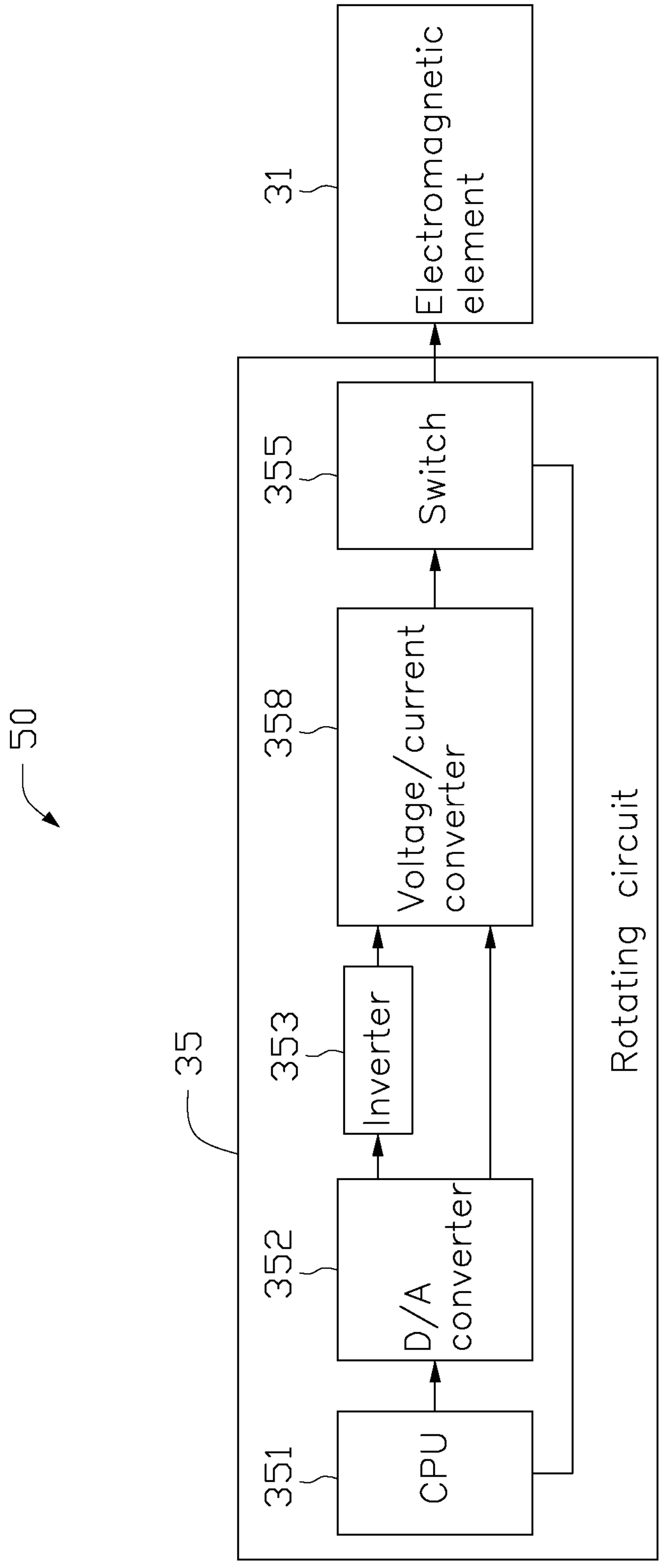
FIG. 6 is another block diagram of the rotating unit of the wireless communication device of FIG. 1.

FIG. 6 illustrates another embodiment of the wireless communication device including a rotating unit 50. The rotating unit 50 is similar to the rotating unit 30 and only in difference that the switch 355 of the rotating unit 30 is replaced by the voltage/current converter 358 of the rotating unit 50, and the voltage/current converter 357 of the rotating unit 30 is replaced by the switch 355 of the rotating unit 50. The CPU 351 is electrically connected to the D/A converter 352. One end of the D/A converter 352 is directly and electrically connected to the voltage/current converter 358. The other end of the D/A converter 352 is electrically connected to the voltage/current converter 358 through the inverter 353. The voltage/current converter 358 is electrically connected to the electromagnetic element 31 through the switch 355.

In at least one embodiment, the CPU 351 is configured to detect a signal receiving/sending strength of the antenna 10, provide different voltages to the D/A converter 352 according to the detected signal receiving/sending strength, and control a switching of the switch 355. The D/A converter 352 is configured to convert the voltage provided by the CPU 351 from an analog signal to a digital signal. The inverter 353 is configured to inverter the voltage from the D/A converter 352. The voltage/current converter 358 converts the voltage from the D/A converter 352 or the inverter 353 to a current with two different directions. The switch 355 is a single pole double throw switch and is configured to select one of the currents to output to the electromagnetic element 31, so as to control a magnetic force and a polarity direction of the electromagnetic element 31.

Figure 7:
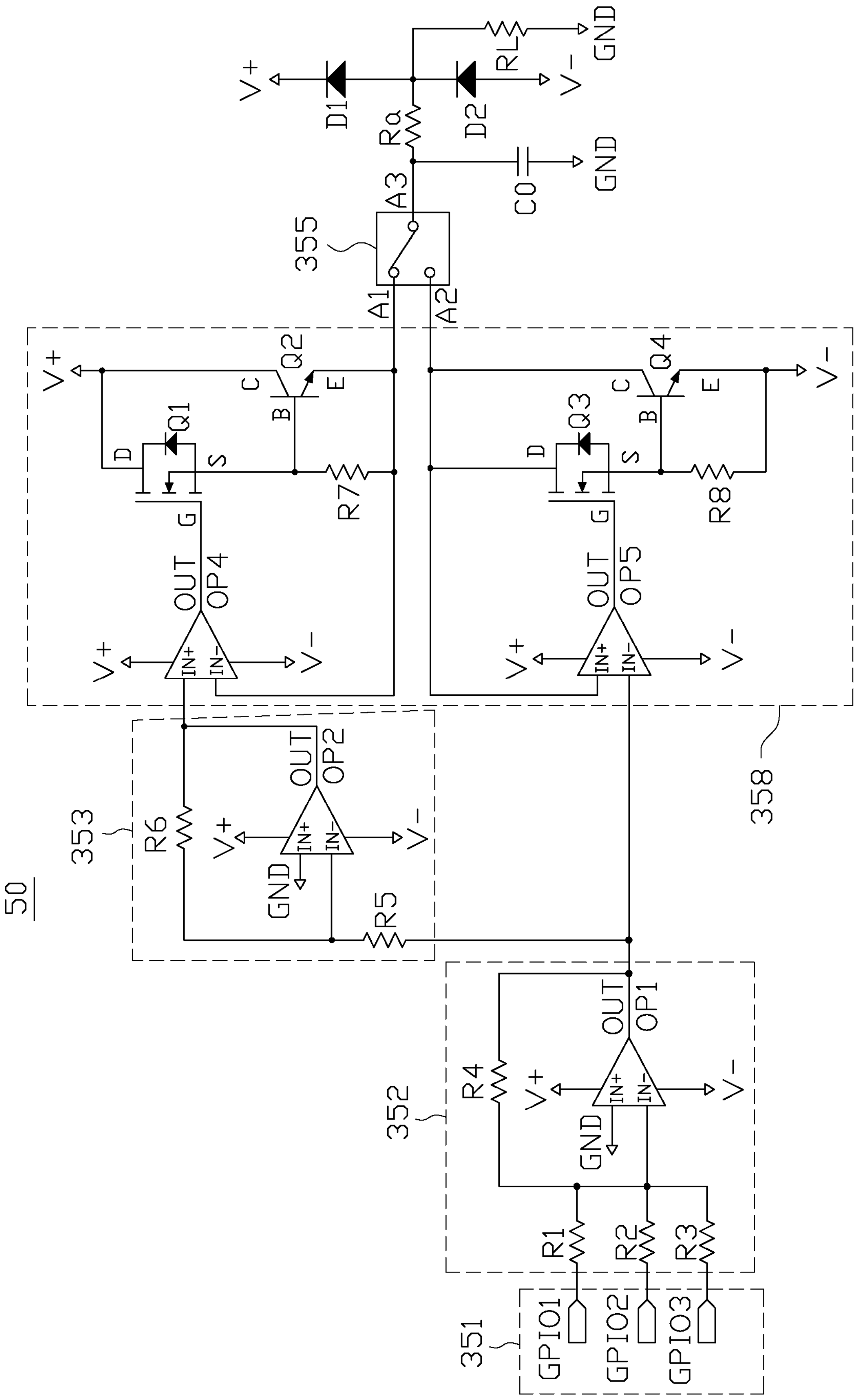
FIG. 7 is another circuit diagram of the rotating unit of the wireless communication device of FIG. 1.

As illustrated in FIG. 7, in at least one embodiment, the CPU 351 includes a first general input/output pin GPIO 1, a second general input/output pin GPIO 2, and a third general input/output pin GPIO 3. The D/A converter 352 includes a first operational amplifier OP1, a first resistor R1, a second resistor R2, a third resistor R3, and a fourth resistor R4. The first operational amplifier OP1 includes a positive input pin IN–F, a negative input pin IN−, and an output pin OUT. The positive input pin IN+ is grounded. The first general input/output pin GPIO 1, the second general input/output pin GPIO 2, and the third general input/output pin GPIO 3 are respectively connected to the negative input pin IN− through the first resistor R1, the second resistor R2, and the third resistor R3. The negative input pin IN− is further electrically connected to the output pin OUT through the fourth resistor R4. The output pin OUT is further electrically connected to the inverter 353 and the voltage/current convert 358.

The inverter 353 includes a second operational amplifier OP2, a fifth resistor R5, and a sixth resistor R6. The second operational amplifier OP2 includes a positive input pin IN+, a negative input pin IN−, and an output pin OUT. The positive input pin IN+ of the second operational amplifier OP2 is grounded. The negative input pin IN− of the second operational amplifier OP2 is electrically connected to the output pin OUT of the first operational amplifier OP1 through the fifth resistor R5, and is further electrically connected to the output pin OUT of the second operational amplifier OP2 through the sixth resistor R6. The output pin OUT of the second operational amplifier OP2 is electrically connected to the voltage/current converter 358.

The voltage/current converter 358 includes a fourth operational amplifier OP4, a first transistor Q1, a seventh resistor R7, a second transistor Q2, a fifth operational amplifier OP5, a third transistor Q3, an eighth transistor R8, and a fourth transistor Q4. In at least one embodiment, the first transistor Q1 and the third transistor Q3 are N-channel MOSFETs. The second transistor Q2 and the fourth transistor Q4 are NPN-type triodes.

The fourth operational amplifier OP4 includes a positive input pin IN+, a negative input pin IN−, and an output pin OUT. The positive input pin IN+ of the fourth operational amplifier OP4 is electrically connected to the output pin OUT of the third operational amplifier OP3. The negative input pin IN− of the fourth operational amplifier OP4 is electrically connected to a source S of the first transistor Q1 and a base B of the second transistor Q2 through the seventh resistor R7, and is further electrically connected to the switch 355. The output pin OUT of the fourth operational amplifier OP4 is electrically connected to a gate G of the first transistor Q1. The base B of the second transistor Q2 is further electrically connected to the source S of the first transistor Q1. A collector C of the second transistor Q2 is electrically connected to a drain D of the first transistor Q1, and is further connected to the power supply V+. An emitter of the second transistor Q2 is electrically connected to the negative input pin IN− of the fourth operational amplifier OP4 and is further electrically connected to the switch 355.

The fifth operational amplifier OP5 includes a positive input pin IN+, a negative input pin IN−, and an output pin OUT. The positive input pin IN+ of the fifth operational amplifier OP5 is electrically connected to a drain D of the third transistor Q3, a collector C of the fourth transistor Q4, and is further electrically connected to the switch 355. The negative input pin IN− of the fifth operational amplifier OP5 is electrically connected to output pin OUT of the first operational amplifier OP1. The output pin OUT of the fifth operational amplifier OP5 is electrically connected to a gate G of the third transistor Q3. A source S of the third transistor Q3 is electrically connected to a base B of the fourth transistor Q4 and is further electrically connected to an emitter E of the fourth transistor Q4 through the eighth resistor R8. The emitter E of the fourth transistor Q4 is further electrically connected to the power supply V−. The first to fifth operational amplifiers OP1-0P5 are all electrically connected to the power supplies V+, V−, thereby obtaining corresponding working voltages.

The switch 355 includes a first switching end A1, a second switching end A2, and a connecting end A3. The first switching end A1 is electrically connected to the emitter E of the second transistor Q2. The second switching end A2 is electrically connected to the collector C of the fourth transistor Q4.

The electromagnetic element 31 has an internal resistance, which is labeled as RL. Then, the connecting end A3 is grounded through the adjusting resistor Ra and the electromagnetic element 31 connected in series. The connecting end A3 is further grounded through a capacitor C0. In at least one embodiment, the capacitor C0 is a filter capacitor. A first end of the adjusting resistor Ra connected to the electromagnetic element 31 is further electrically connected to an anode of a first diode D1 and a cathode of a second diode D2. A cathode of the first diode D1 is electrically connected to the power source V+. An anode of the second diode D2 is electrically connected to the power source V−. In at least one embodiment, the first diode D1 and the second diode D2 are flywheel diode for protecting inductance components. The switch 355 is further electronically connected to the CPU 351. The CPU 351 can control the connecting end A3 to switch to the first switching end A1 or the second switching end A2. The connecting end A3 is electrically connected to the electromagnetic element 31 through the adjusting resistor Ra for outputting current to the electromagnetic element 31.

It can be understood that a magnetic force of the electromagnetic element 31 can be controlled by a voltage provided by the CPU 351 and can be adjusted by changing coil number of the electromagnetic element 31, a magnetic material of the electromagnetic element 31, a weight of the permanent magnet 151, a weight of the antenna 10, a distance between the permanent magnet 151 and the electromagnetic element 31, and a resistance of the adjusting resistor Ra.

In at least one embodiment, there only shows that the CPU 351 includes three general input/output pins (that is, the first general input/output pin GPIO 1, the second general input/output pin GPIO 2, and the third general input/output pin GPIO 3). The three general input/output pins are respectively connected to the first resistor R1, the second resistor R2, and the third resistor R3 of the D/A converter 352. That is, the D/A converter 352 is a 3-bit D/A converter and is configured to output 8-rank different voltages. It can be understood that, in other embodiments, the number of the general input/output pins of the CPU 351 can be adjusted according to a user's need, for example, the CPU 351 can includes n general input/output pins. The n general input/output pins are respectively connected to the n resistors of the D/A converter 352. That is, the D/A converter can be adjusted to be a N-bit D/A converter.

Figure 8A:
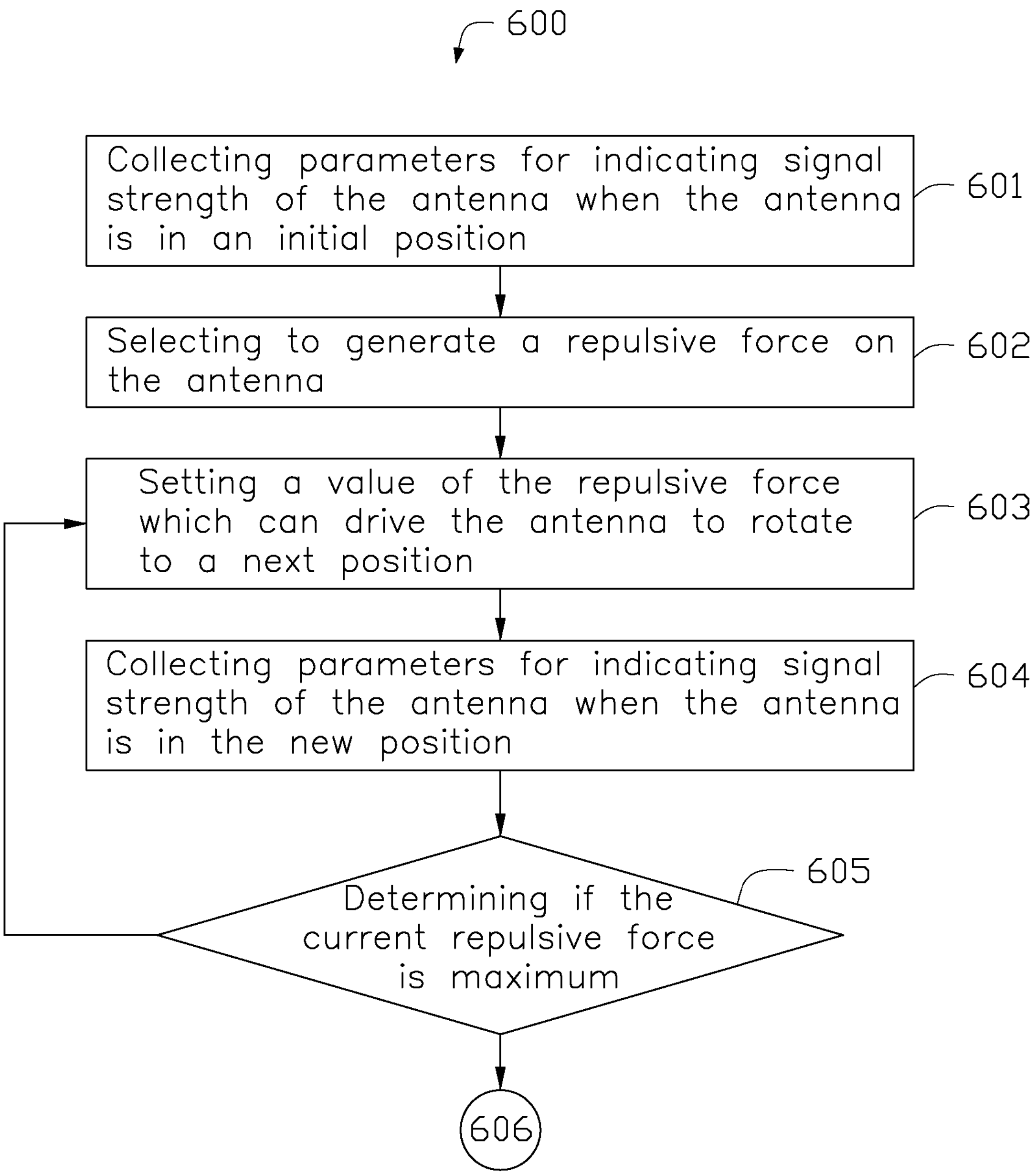
FIGS. 8*a* and 8*b* are a flowchart of a rotating controlling method for the antenna of FIG. 1.
Figure 8B:
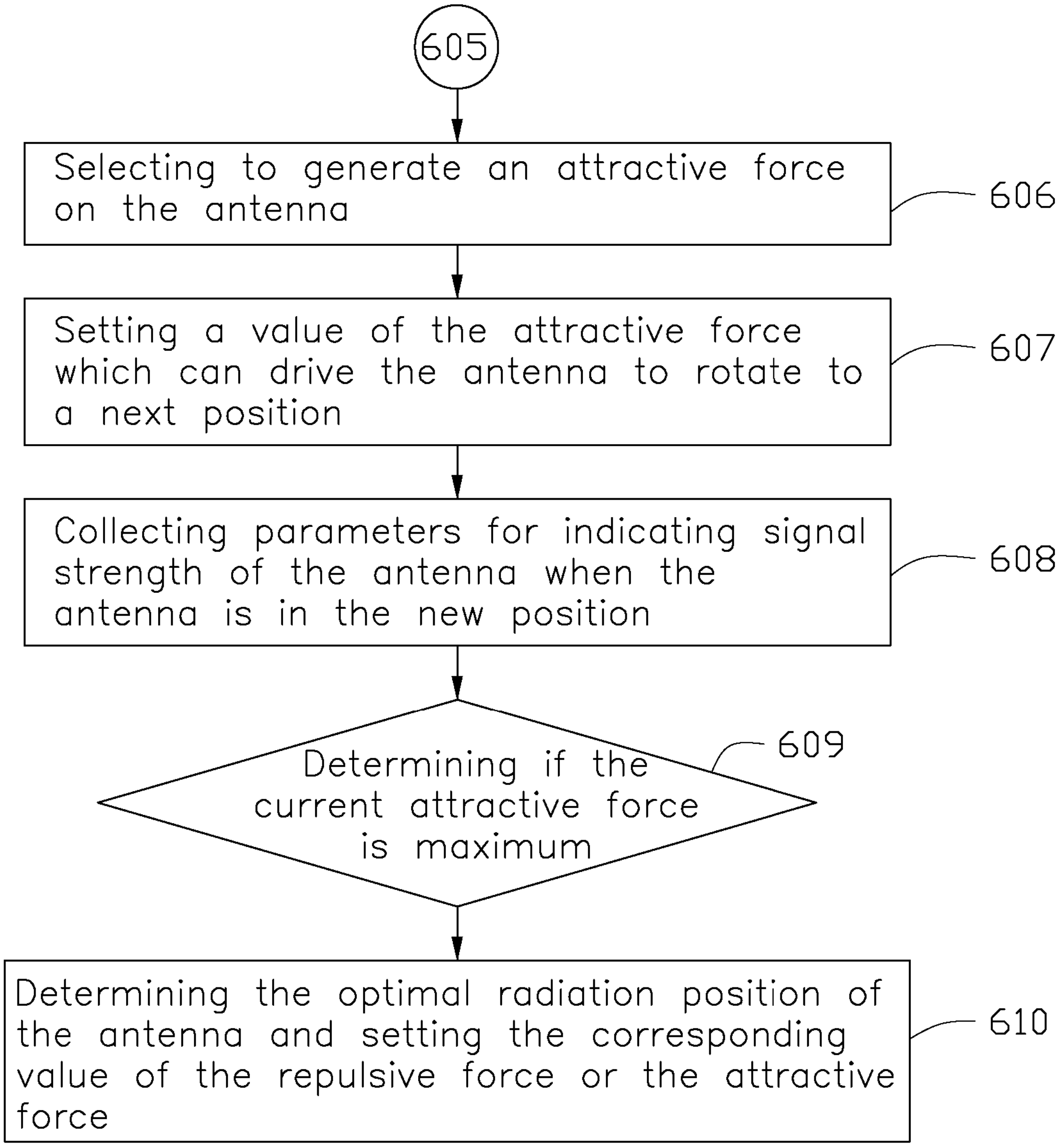

FIGS. 8*a* and 8*b* illustrate a flowchart of a method for controlling a rotation of the antenna 10 of FIG. 1. The method is provided by way of example, as there are a variety of ways to carry out the method. Each block shown in FIGS. 8*a* and 8*b* represents one or more processes, methods, or subroutines which are carried out in the example method. Furthermore, the order of blocks is illustrative only and the order of the blocks can change. Additional blocks can be added or fewer blocks may be utilized without departing from the scope of this disclosure. The example method can begin at block 601.

At block 601, when the antenna 10 is in an initial position, collecting parameters for indicating signal strength of the antenna 10, for example, a receive signal strength indicator (RSSI), a signal noise ratio (SNR), and/or a connection speed.

At block 602, selecting to generate a repulsive force on the antenna 10. In detail, it can be realized through controlling the switch 355 to select the D/A converter 352 to be electrically connected to the voltage/current converter 357, 358.

At block 603, setting a value of the repulsive force which can drive the antenna 10 to rotate to a next position. The repulsive force can be added. The number of the general input/output pins of the CPU 351 can be added. For example, if the current first general input/output pin GPIO1 outputs a voltage to the D/A converter 352, then the second general input/output pin GPIO2 can be set to output a voltage to the D/A converter 352, which can make the current from the rotating unit 30, 50 to the electromagnetic element 31 to be added, thereby driving the antenna 10 to rotate to the next position.

At block 604, collecting parameters for indicating signal strength of the antenna 10 when the antenna 10 is in the new position.

At block 605, determining if the current repulsive force is maximum. When the current repulsive force is maximum, the block 606 is operated. When the current repulsive force is not maximum, return to block 603.

At block 606, selecting to generate an attractive force on the antenna 10. In detail, it can be realized through controlling the switch 355 to select the inverter 353 to be electrically connected to the voltage/current converter 357, 358.

At block 607, setting a value of the attractive force which can drive the antenna 10 to rotate to a next position. An attractive force can be added. The number of the general input/output pins of the CPU 351 can be added. For example, if the current first general input/output pin GPIO1 outputs a voltage to the D/A converter 352, then the second general input/output pin GPIO2 is set to output a voltage to the D/A converter 352, which can make the current from the rotating unit 30, 50 to the electromagnetic element 31 to be added, thereby driving the antenna 10 to rotate to the next position.

At block 608, collecting parameters for indicating signal strength of the antenna 10 when the antenna 10 is in the new position.

At block 609, determining if the current attractive force is maximum. When the current attractive force is maximum, the block 610 is operated. When the current attractive force is not maximum, return to block 607.

At block 610, determining the optimal radiation position of the antenna 10 and setting the corresponding value of the repulsive force or the attractive force, then the antenna 10 can be rotated to the optimal radiation position.

It can be understood that when a new user is joined in a wireless network or the parameters of the current user are changed, the method can be operated again at block 601.

The embodiments shown and described above are only examples. Many details are often found in the art such as the other features of the antenna module and the wireless communication device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A rotating controlling method for an antenna, comprising:

(a) determining a repulsive force and an attractive force for rotating the antenna;

(b) rotating the antenna by the repulsive force and the attractive force, respectively;

(c) collecting parameters for indicating signal strength of the antenna during rotating the antenna;

(d) selecting to generate the repulsive force on the antenna;

(e) setting a value of the repulsive force which drives the antenna to rotate to a next position;

(f) collecting the parameters for indicating the signal strength of the antenna when the antenna is in the next position;

(g) determining if a current repulsive force is maximum;

(h) when the current repulsive force is maximum, selecting to generate the attractive force on the antenna;

(i) setting a value of the attractive force which drives the antenna to rotate to a new position;

(j) collecting the parameters for indicating the signal strength of the antenna when the antenna is in the new position;

(k) determining if a current attractive force is maximum;

(l) when the current attractive force is maximum, determining an optimal radiation position of the antenna; and (m) rotating the antenna to the optimal radiation position.

2. The method of claim 1, further comprising:

when the current repulsive force is not maximum, returning to step (e), and when the current attractive force is not maximum, returning to step (i).

* * * * *